United States Patent

Albright

[15] 3,665,612
[45] May 30, 1972

[54] CONTINUOUS TEMPLATE FLOW CHARTING APPARATUS AND METHOD

[72] Inventor: Daniel M. Albright, 107 Sycamore, Lake Jackson, Tex. 77566

[22] Filed: Nov. 4, 1970

[21] Appl. No.: 86,742

[52] U.S. Cl....................................................33/174 B, 33/80
[51] Int. Cl............................................................B44d 3/32
[58] Field of Search....................33/174 B, 1 B, 76, 80, 23 K; 101/127.1, 127

[56] References Cited

UNITED STATES PATENTS 2,152,904  4/1939  McNeil...................................33/174 B

FOREIGN PATENTS OR APPLICATIONS 1,261,132  4/1961  France.......................................33/80

Primary Examiner—Harry N. Haroian
Attorney—Arnold, White & Durkee, Paul Van Slyke, Tom Arnold, Frank S. Vaden, III and Robert A. White

[57] ABSTRACT

Apparatus is described for aid in drawing computer flow charts. The apparatus includes a template band formed in a closed loop with cutouts the flow chart symbols. The upper portion of the template band is held flat against the surface of a drawing board, the remaining loop of the template band encircling the drawing board. A guide mechanism holds the bracket square with the drawing board. The template band can be moved horizontally through the bracket and vertically with the bracket to position cutouts at desired locations on the drawing surface.

15 Claims, 8 Drawing Figures

PATENTED MAY 30 1972 3,665,612

Daniel M. Albright
INVENTOR

BY
Arnold, White & Durkee
ATTORNEYS

PATENTED MAY 30 1972 3,665,612
SHEET 2 OF 3
FIG. 3
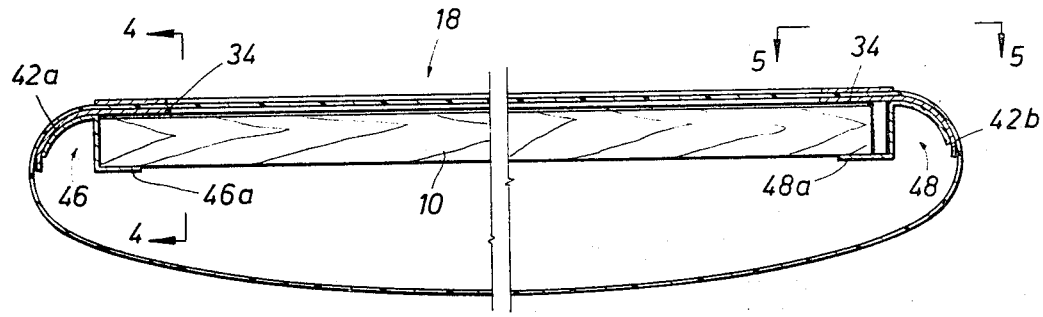
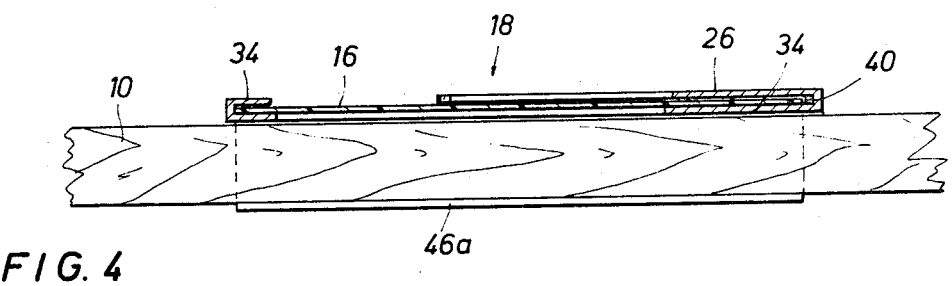
FIG. 4
FIG. 5
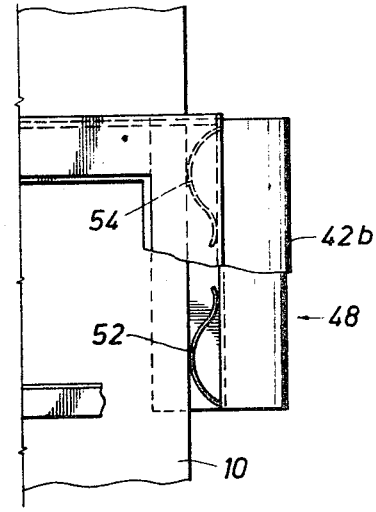
FIG. 6
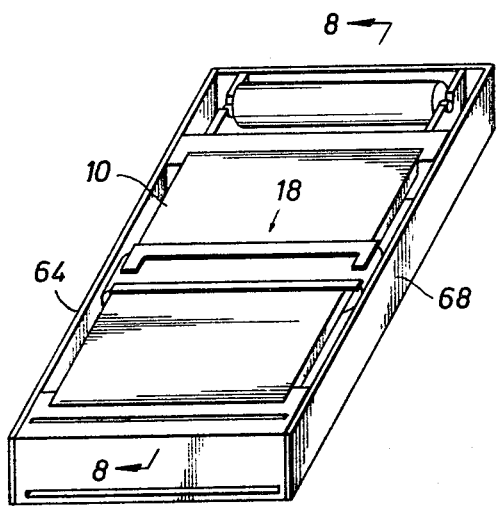
Daniel M. Albright
INVENTOR
BY
Arnold, White & Durkee
ATTORNEYS

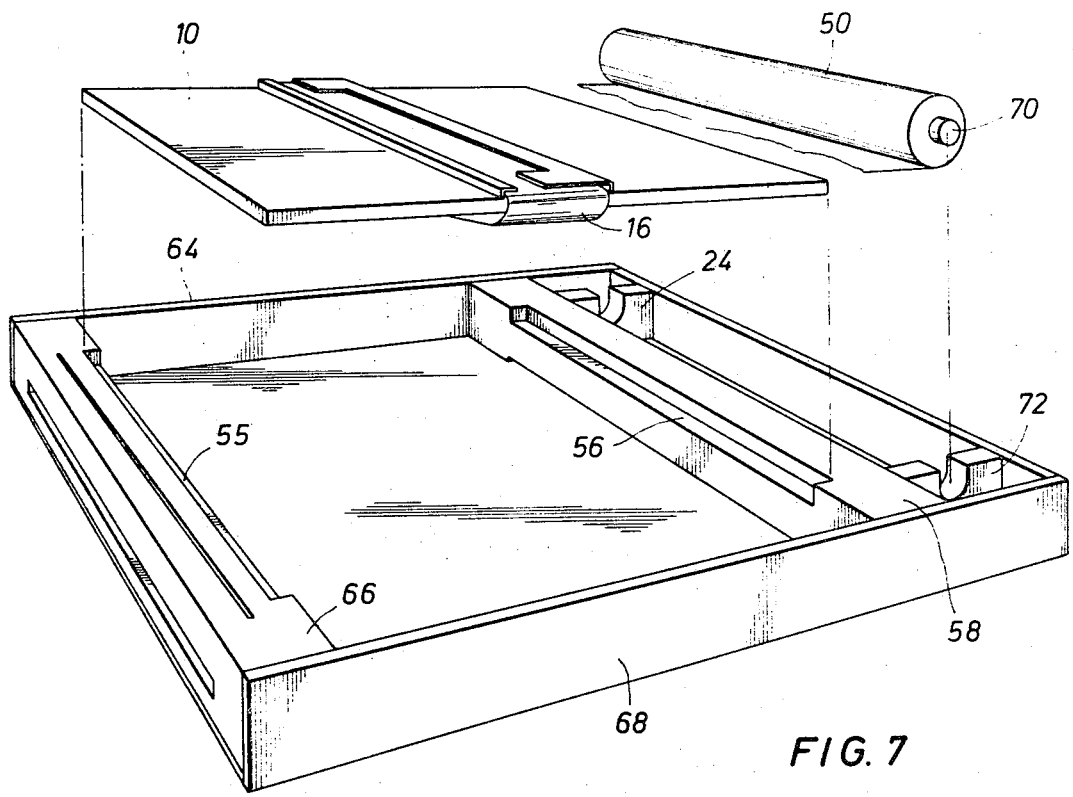
FIG. 7
FIG. 8
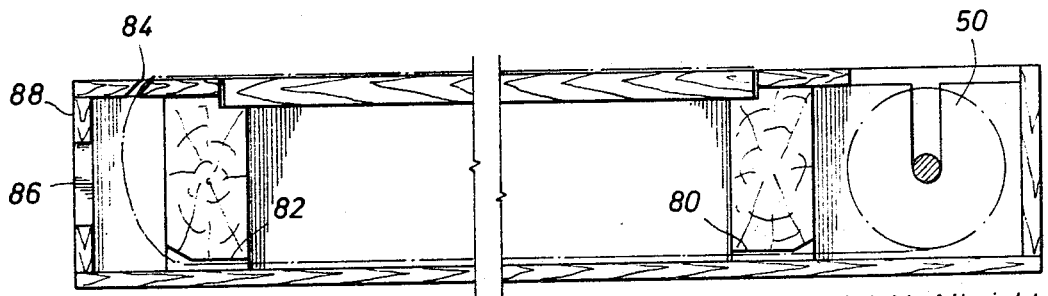
Daniel M. Albright
INVENTOR
BY
Arnold, White & Durkee
ATTORNEYS

её3,665,612

CONTINUOUS TEMPLATE FLOW CHARTING APPARATUS AND METHOD

BACKGROUND OF THE INVENTION

This invention relates to drafting machines and methods and more specifically to an apparatus and method for aid in drawing computer flow charts.

In the programming of computers and data processing systems, it is commonly required to prepare flow charts which show in abbreviated form the flow of information. Such flow charts are a great aid to quick understanding of the sequence of processing steps to even a skilled programmer who is unfamiliar with the program. They also help teach the fundamentals of computer programming to computer science students. Thus, computer flow charts are often prepared in rough form at the time of preparing the computer program and are often prepared after the sequence of instructions for the computer has already been prepared as a post-programming documentation step.

At the present time, computer program flow charts are prepared in advance of preparation of the program by manual drafting methods using a flat rectangular template having cutouts in the shapes of flow chart symbols. To prepare a neat flow chart in a short period of time, may be difficult for a computer science student who has little ability in draftsmanship. To some extent, the performance of computer programmers and computer programming students, is marred by their inability at drafting.

SUMMARY OF THE INVENTION

The purposes of the present invention is to simplify drawing of flow charts for computer programs, to make the flow charts neater and to produce them at less cost than with presently known equipment and techniques.

The apparatus according to this invention employs a continuous template in the form of a closed loop of flexible material. The template band includes around its periphery, cutouts for various types of flow chart symbols. The template band is held in position over a drafting board by bracket structure, or other suitable means, in position on a drawing board. The template is held flat against the drawing surface and the remainder of the template band encircles the drawing board. The flow charter may move the template vertically over the drawing board for use in drawing flow charts and may also move the continuous template band laterally across the board.

The invention can also be characterized as a method of using the continuous template band to draw flow charts in combination with the drawing board.

A novel housing is also provided by the invention for supporting a drawing board used with the template and bracket referred to above.

BRIEF DESCRIPTION OF THE DRAWINGS

Specific embodiments and further details of the invention will now be described with reference to the accompanying drawings which are briefly described as follows:

FIG. 3 is a sectional view taken along line 3—3 in FIG. 1;

FIG. 4 is a sectional view taken along line 4—4 in FIG. 3;

FIG. 5 is a sectional view of the guide mechanism taken along line 5—5 in FIG. 3;

FIG. 6 is a perspective view of one embodiment of a housing for supporting the apparatus of FIG. 1;

FIG. 7 is a perspective view, partly exploded, of the housing of FIG. 6; and,

FIG. 8 is a sectional view of the housing taken along line 8—8 in FIG. 6.

DESCRIPTION OF SPECIFIC EMBODIMENTS

Figure 1:
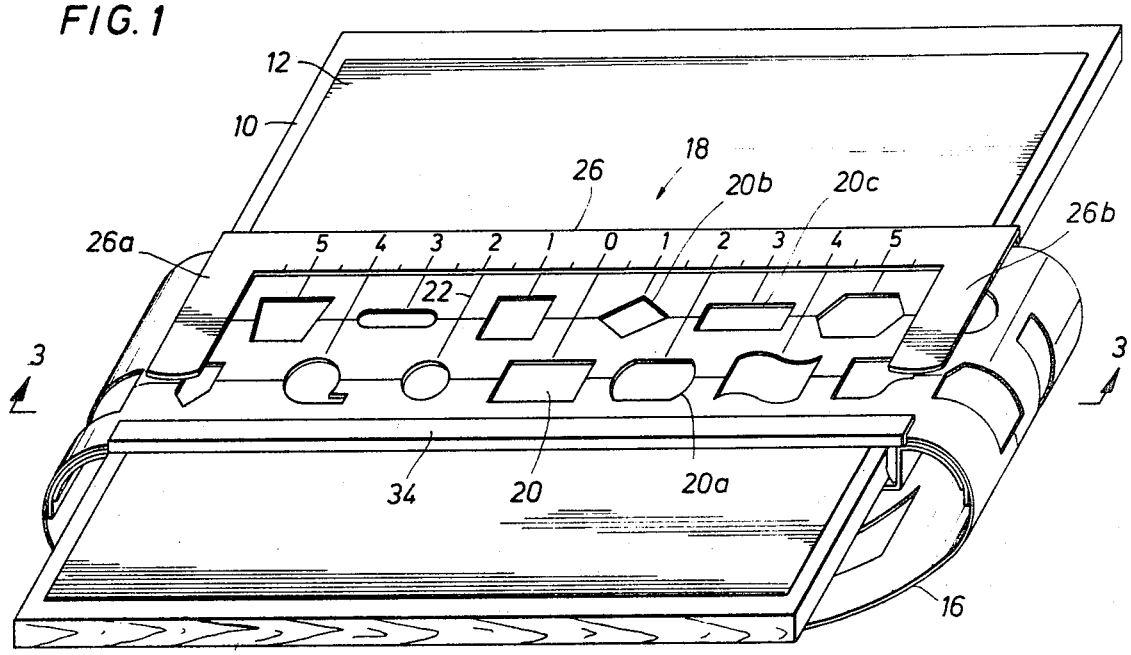
FIG. 1 is a perspective view of one form of apparatus embodying the invention, in place for drawing on a drawing board.

Referring to FIG. 1, an embodiment of the invention is shown in position on a drawing board 10 on which is fixed a sheet of drafting paper 12. A template band 16 encircles the drawing board 10 and is held in place by a bracket 18. The template band 16 is formed of a closed loop of flexible material and is preferably transparent. The template band 16 is composed, for example, of a clear plastic material about ⅛-inch thick with a length of few inches more than twice the width of the drawing board 10.

Formed in the template band 16 are a number of cutouts 20 in the shape of the outline of flow chart symbols. The cutouts 20 are located around the periphery of the template band 16 to provide a multiplicity of template openings for drawing many flow chart symbols. The cutouts may include special patterns to meet the needs of particular application. Numerals, letters and such words as GO TO, PAUSE, PRINT, PUNCH, MERGE, and END could also be included. The template band 16 is held in place over the drawing board 10 by the bracket 18 which includes guide mechanisms to maintain the template band 16 square at all times with the drawing board 10. The bracket 18 can be moved vertically along the drawing board 10 to position different cutouts over the drafting surface for aid in drawing flow charts. The template band 16 can be moved horizontally across the drafting surface through the bracket 18. The bracket 18 is designed and constructed to hold the upper segment of the template band 16 in a plane configuration and square at all times with the surface drawing board 10.

The cutouts formed in the template band 16 are positioned in a coordinate grid pattern, which pattern is indicated by horizontal and vertical markings 22. As illustrated, the flow chart symbols are provided on a staggered configuration. For example, the cutout 20a is located halfway in between the cutouts 20b and 20c. Two horizontal rows of cutouts 20 are illustrated but of course any number of rows can be provided.

Along the upper flange 26 of the bracket 18 is located a scale which permits an operator to align the cutouts 20 in the proper coordinate position in drawing the flow charts. A flow charter can maintain vertical and horizontal alignment of the centers of flow chart symbols on a flow chart and fill up an entire sheet of drawing paper. The vertical lines on the template used in conjunction with the scale on the upper flange 26 assure vertical alignment of several strings of symbols. The flow charter is thus assured that the lowest symbol on the chart can be neatly joined by a straight line to the topmost symbol. The horizontal lines on the template band 16 are used to provide horizontal alignment between symbols already drawn and the one about to be drawn.

If a portion of the computer program should change, so it would necessitate a change in a portion of the flow chart symbols, it is very easy to use the device shown in FIG. 1 to reconstruct the new part of the flow chart and direct coordinate alignment with the existing and unchanged flow chart symbols in the flow chart.

Although the template band 16 can be provided with several sizes of each symbol to meet most needs, the need may arise for an even larger symbol. Most symbols, (with the exception of those containing circular arcs) can be doubled in perimeter by drawing them with two bracket settings, each of which include two template settings. Extreme enlargement of a symbol would require more bracket settings, but because of the alignment feature, the process is quickly accomplished.

Figure 2:
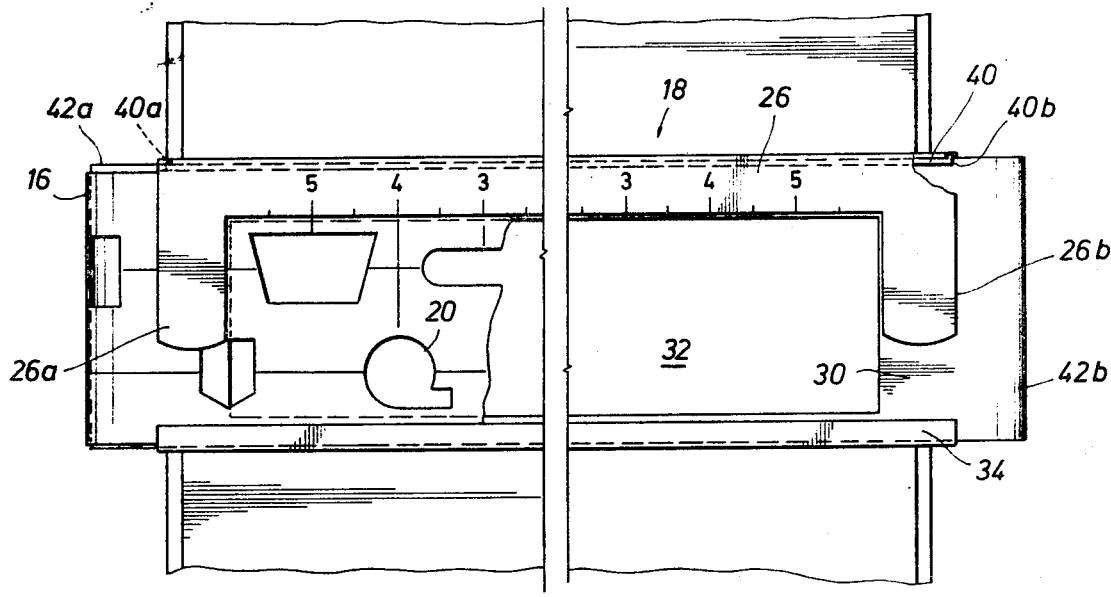
FIG. 2 is a top view of the bracket structure of FIG. 1 with the bracket partly cut way.

Referring now to FIGS. 2, 3, and 4, the bracket 18 is comprised of a flat frame 30 which rests directly on the upper surface of a drawing board. The flat frame 30 defines a rectangular opening 32 through which drawing symbols may be made with the aid of the cutouts 20 in the template band 16. The bracket 18 includes a lower flange 34 and a upper flange 26. Lower flange 34 defines a groove or slot in which sits the lower edge of the template band 16. Lower flange 34 may be formed of the same piece of material as is the flat frame 30 and may be folded upward in the manufacture to form a flange. Alternatively, the lower flange 34 can be formed of a separate piece of material and be welded or otherwise attached to the flat frame 30.

In similar fashion, the upper flange 26 is attached to the upper edge of the flat frame 30, and defines a groove or slot in which fits the upper edge of the template band 16. The upper flange 26 includes left extension 26a and a right extension 26b. Each of the extensions 26a and 26b extend parallel to the flat frame 30 to provide a constraint for holding a segment of the template band 16 in a planar configuration. A gap is provided between the end of extensions 26a and 26b and the lower flange 34 in order to permit removal of the template band 16 from the bracket 18.

The template band 16 is maintained in uniform tension and in squareness with the bracket 18 by means of a uniform pressure spring or bar 40. Pressure bar 40 is a long slender strip of resilient material such as spring steel which is maintained in compression at each end so that it bows outwardly to urge the lower edge of the template band 16 firmly against the groove provided by the lower flange 34. Compression is provided on the bar 40 by means of having each end of the bar 40 located in a slot at the edge of the upper flange 26. Turned down end portions 40a and 40b sit in the respective slots in upper flange 26.

In an alternative embodiment, the uniform pressure bar 40 can be fabricated of a relatively rigid material and urged toward template band 16 by means of separate springs. For example, any suitable type of springs, such as band springs or coil springs, can be located in the space between uniform pressure bar 18 and the side wall of upper flange 26.

Each end of the flat frame 30 is curved downwardly in a smooth curvature to form a pair of skirts 42a and 42b. The template band 16 thus rests in a smooth curvature over the edge of skirts 42a and 42b.

Focusing now specifically upon FIGS. 3 and 4, the bracket 18 is maintained square with the drawing board 10 by a guide mechanism including a left guide flange 46 and a right guide flange 48. Guide flanges 46 and 48 include a curved upper portion that fits snugly underneath the skirts 42a and 42b. It may, for example, be attached by welding, bradding, or otherwise to the skirts 42a and 42b. The inner surface of the side wall of the left guide flange 46 fits snugly against the edge of the drawing board 10 to provide a guide rail. Thus, the inner surface of the side wall of flange 46 is maintained perpendicular to the longitudinal axis of the bracket 18. The guide flange 46 operates in the same manner as would the edge piece of an ordinary T-square. Each of guide flanges 46 and 48 includes a downturned lip 46a and 48a which engages the under surface of the drawing board 10. The distance between the lips 46a and 48a and the underside of the flat frame may be the standard dimensions for a drawing board. In certain cases, it may be desirable to eliminate the lips 46a and 48a in order to provide a fit with drawing boards of variable thicknesses or, for example, to fit upon a drawing board that has obstructions on its underneath surface. These lips are not essential to the maintenance of a proper fit with the drawing surface but are merely provided to maximize the fit.

In FIG. 5 is shown in cut away, the details of the right guide flange 48. The inner edge of the side wall of the right guide flange 48 is spaced a short distance from the edge of the drawing board 10. A pair of band springs 52 and 54 are mounted to the inner wall of flange 48 and engage the edge of the drawing board 10. Band springs 52 and 54 thus urge the bracket 18 outwardly of the edge of the drawing board 10. Each of band springs 52 and 54 is attached at one end to the side wall of the flange 48 as by a curved portion fitting into an unshown slot.

The bracket structure shown in the drawings and described above can take various forms and shapes depending upon the application desired. In certain applications, it may be constructed of metal and in other applications, such as, for example, for student use, it may be constructed primarily of plastic.

The bracket structure and template can be designed to accommodate any number of different types of drawing boards and drawing surfaces. Illustrated in the accompanying drawings has been a flat drawing board which is unattached to any support, but it is apparent that the bracket and template device can be used with drawing tables which include a drawing board surface maintained at an inclined angle.

Referring now again, to FIG. 1, the template band 16 can be removed from the bracket structure by holding the bracket stationary and moving the template band 16 forward with the fingers. The uniform pressure bar 40 will be compressed and the lower edge of the template band 16 can be cleared from the lower flange 34. Alternatively, pressure can be released from template band 16, by removing the turned down portions 40a and 40b from the slots in upper flange 26 and removing pressure bar 40 by sliding it longitudinally from the bracket 18. The template band 16 can then be removed from the edge of the drawing board 10 through the gap between the extensions 26a and 26b. The template band, thus, may be readily removed and changed for other types and can also be removed rather quickly and easily for cleaning. Inserting a template band is accomplished by reversing the procedure outlined above. Templates can be replaced with updated templates without replacing the entire apparatus.

The bracket 18 is easily inserted on the edge of the drawing board by feeding the edges of the drawing board through the guide flanges 46 and 48.

The entire apparatus described above can be built to satisfy the needs of a variety of consumers. Computer science students could probably afford a scaled down but an effective model as easily as an engineering student can afford a slide rule. To some extent, programming ability would not be marred by inability as a draftsman.

A convenient housing for supporting the bracket is illustrated in FIGS. 6, 7, and 8. Referring to these figures, the housing is provided by a rectangular shaped frame which provides the support for drafting board 10 and also provides a convenient means for holding and feeding a roll of drawing paper 50. The upper and lower ends of the drawing board 10 are supported in a pair of grooves 55 and 56 which are formed respectively in support members 58 and 60 in the frame structure. A gap is provided between each edge of the drawing board and the side walls 64 and 68 of the frame structure. This gap provides the clearance for the edge portion of the bracket 18.

The side walls 64 and 68 define the sides of a chamber beneath the drawing board 10 which has sufficient depth for providing clearance for the lower edge of the template band 16.

The roll of drawing paper 50 is held in place by end cores 70 which fit in mating slots in end blocks 72 and 74. The paper is fed from the roll 50 through slots 80, 82 and 84 to the upper surface of the drawing board 10. A slot 86 is provided in the end wall 88 of the box structure to enable hand feeding of the sheet of paper through the upper slot 84.

The lower or upper edge of the bracket 18 may be provided with a cutting edge to aid in cutting the roll of paper as each flow chart is completed.

Specific embodiments have been described above for the purpose of illustrating the invention, but it should be apparent that the invention can have other embodiments which combine various features of the invention. It is intended to cover all such embodiments as fall within the scope of the appended claims.

What is claimed is:
1. A drafting machine comprising:
 a template band formed of a closed loop of flexible material, the template band having formed therein template openings for aid in drawing drafting symbols;
 means for supporting one segment of the template band in a plane against the surface of a drawing board, the remaining portion of the template band encircling the drawing board; and, means for holding the template band square in alignment with such drafting board as the template band is moved horizontally and vertically over surface of the drafting board.

2. Apparatus for aid in drawing flow charts, comprising:
a template band formed of a closed loop of flexible material, the template band having formed therein template openings for use in drawing flow chart symbols;
a bracket adapted to support the template band to encircle a drawing surface;
means carried by the bracket for holding one segment of the template band in a plane against the drawing surface;
means carried by the bracket for holding the template band parallel with a base line as the template band is moved in a direction parallel to the base line; and,
means carried by the bracket for holding the template band perpendicular with the base line as the bracket is moved perpendicular to the base line, whereby the template band is maintained in coordinate alignment with the drawing surface as it is moved about in drawing flow chart symbols.

3. The apparatus of claim 2 wherein the template band includes vertical markings and a scale is carried by the bracket to permit vertical alignment of flow chart symbols in conjunction with such vertical markings.

4. The apparatus of claim 2 wherein the template band includes horizontal markings to permit horizontal alignment of flow chart symbols.

5. Apparatus for aid in drawing flow charts, comprising:
a template band formed of a closed loop of flexible material, said template band having formed therein template openings for use in drawing flow chart symbols;
a bracket for holding the template band in working relationship encircling a drawing board, the drawing board having two edges parallel to one another;
two spaced parallel grooves formed in the bracket for holding the template band as it is moved horizontally across the drawing board;
a first guide flange formed at one side of the bracket for engagement with one edge of the drafting board to align said template band square with the drawing board; and,
a second guide flange at the other end of the bracket, the second flange including a spring-biased guide for engagement with the other edge of a drawing board to urge the first guide flange into engagement with the drawing board edge.

6. The apparatus of claim 5 wherein there is a vertical scale carried on the bracket, and vertical markings on the template band to permit vertical alignment of flow chart symbols.

7. The apparatus of claim 6 wherein the template openings in the template band have centers positioned in at least one horizontal row and spaced apart at equal distances from each other.

8. Apparatus of claim 5 wherein a resilient means is located in one of the spaced parallel grooves of the bracket for urging the edge of the template band against the opposite groove of the bracket.

9. Apparatus of claim 5 wherein the resilient means comprises a flexible strip of material maintained in compression at its ends to bow slightly outward to urge the template band against the opposite groove of the bracket.

10. Apparatus of claim 5 wherein the spring-biased means on the second guide flange comprises a pair of guide springs, each of the guide springs being fixed at one end to the second guide flange and being curved outwardly to engage the edge of a drawing board.

11. Apparatus for aid in drawing flow charts, comprising:
a template band formed of a closed loop of flexible material, the template band having formed therein template openings for use in drawing flow chart symbols;
a bracket for holding the template band in working relationship with and encircling a drawing board, the bracket comprising a flat frame having a central opening through which symbols may be drawn, the flat frame having upper, lower, left and right sides;
a lower guide flange carried by the lower side of the flat frame and defining a groove in which is held the edge of the template band;
an upper guide flange carried by the upper end of the flat frame and defining a groove in which is held the upper edge of the template band, the upper guide flange including a pair of extensions along the left and right sides of the flat frame extending toward but not touching the lower guide flange;
a spring mounted in the groove inside the upper guide flange to urge the template band toward the groove in the lower guide flange;
a scale carried by the upper guide flange for aid in aligning the template openings in the template band, aligning markings being formed on such template band; and,
a pair of curved skirts extending respectively from the left and right sides of the flat frame downwardly to provide support for the curved portion of the template band;
a pair of U-shaped guide rails held at the left and right sides of the flat plate, each of the U-shaped guide rails including a lower lip which extends underneath the edge of the drawing board, one of the guide rails including a surface adapted to engage an edge of the drawing board to align the bracket square with the drawing board, the other of the guide rails including a spring biased, to engage the other edge of the drawing board.

12. A method for drawing flow charts on a drawing surface on a drawing board, comprising the steps of:
encircling the drawing board with a template band formed of a closed loop of flexible material having formed therein template openings for aid in drawing flow chart symbols;
flattening a first segment of the template band against the drawing surface of the drawing board;
drawing a flow chart symbol on the drawing surface using one of the template openings enclosed within such first segment;
moving said template band laterally around the drawing board to a new position; and,
flattening a second segment of the template band in a plane against the drawing surface and using a template opening enclosed in the second segment to make a drawing symbol on the drawing surface.

13. The method of claim 12 comprising the further steps of:
moving the template band vertically to a new position on the drawing board;
flattening a segment of the template band against the drawing surface; and,
drawing a flow chart symbol in the drawing surface using one of the template openings in such latter-named segment.

14. A drafting apparatus comprising:
a rectangular frame having top, bottom, and side walls;
a drawing board having upper and lower ends and left and right edges;
a template band formed of a closed loop of flexible material, the template band having formed therein template openings for use in drawing flow chart symbols;
a bracket supporting the template band on the drawing board, the template band encircling the drawing board;
means carried by the bracket holding one segment of the template band in a plane against the surface of the drawing board;
means carried by the bracket for holding the template band parallel with a base line as the template band is moved in a direction parallel to the base line;
means carried by the bracket for holding the template band perpendicular with the base line as the bracket is moved in a direction perpendicular to the base line, whereby the template band is maintained in coordinate alignment with the drawing board;

support members mounted in such frame supporting the upper and lower ends of the drawing board, the side walls of such frame being dimensioned to provide a clearance space between the left and right edges of the drawing board and such side walls, such clearance space being adequate to provide clearance for the template band and the bracket, such support members being constructed to support the drawing board so as to maintain a space for clearance of the template band and bracket beneath the drawing board.

15. The drafting apparatus of claim 14 further comprising:
means forming a chamber in such frame for containing a roll of drawing paper;
means in such chamber for supporting a roll of drawing paper; and,
means forming passages for feeding the roll of paper to the upper surface of the drawing board.

* * * * *